UNITED STATES PATENT OFFICE.

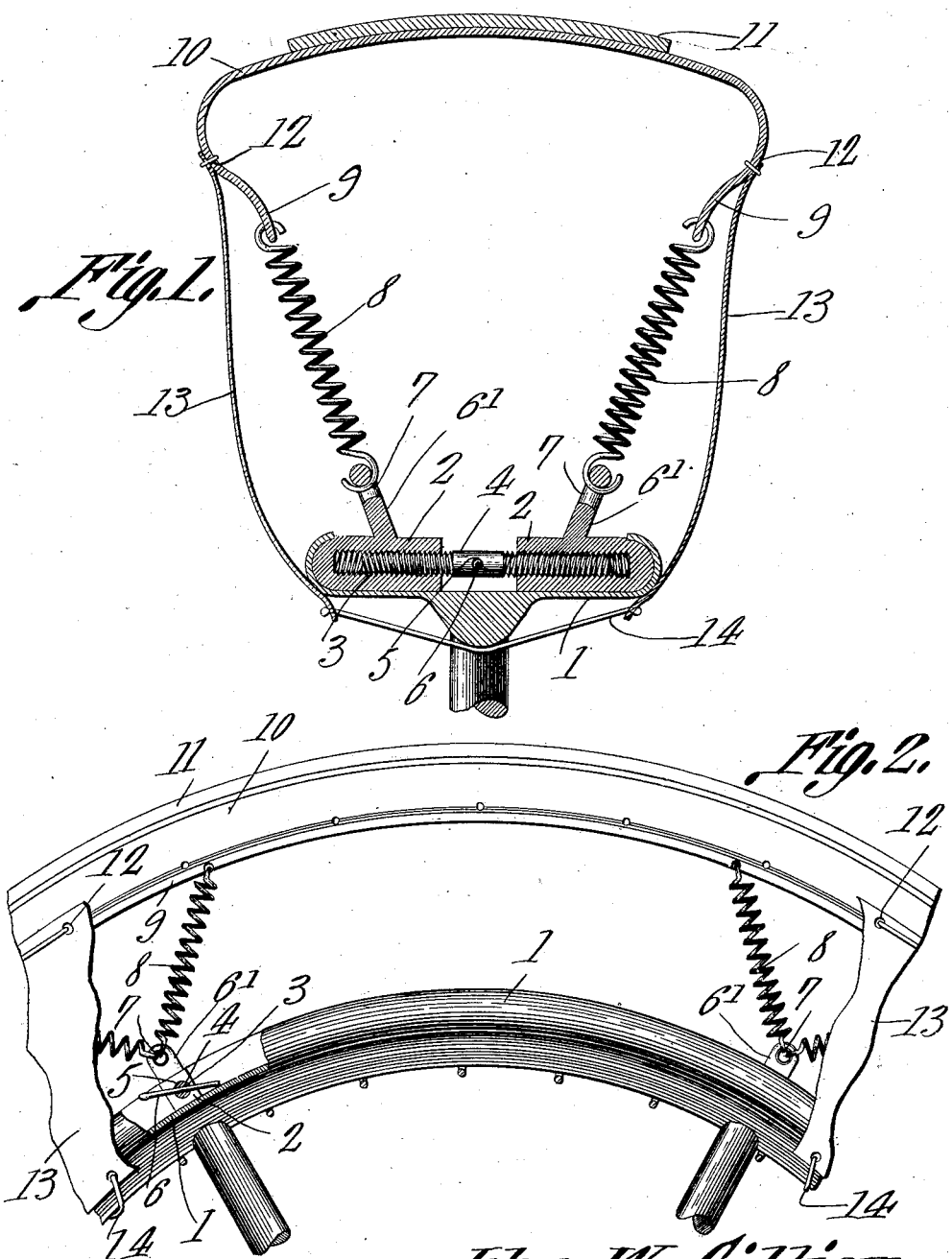

JOHN W. GILLIAM, OF ARROYO GRANDE, CALIFORNIA.

VEHICLE-TIRE.

994,309.  Specification of Letters Patent.  Patented June 6, 1911.

Application filed September 27, 1910. Serial No. 584,118.

*To all whom it may concern:*

Be it known that I, JOHN W. GILLIAM, a citizen of the United States, residing at Arroyo Grande, in the county of San Luis Obispo and State of California, have invented a new and useful Vehicle-Tire, of which the following is a specification.

This invention relates to spring tires for use on various kinds of vehicle wheels, its principal object being to provide an all metal tire which will be as efficient as an ordinary pneumatic tire and which can be readily placed in position upon a wheel and be securely held in such position under all conditions.

With the foregoing and other objects in view which will appear as the description proceeds, the invention resides in the combination and arrangement of parts and in the details of construction hereinafter described and claimed, it being understood that changes in the precise embodiment of invention herein disclosed can be made within the scope of what is claimed without departing from the spirit of the invention.

In the accompanying drawings the preferred form of the invention has been shown.

In said drawings:—Figure 1 is a transverse section through a portion of a wheel rim and showing the tire secured thereon. Fig. 2 is a view partly in side elevation and partly in section of a portion of the wheel rim and the tire thereon.

Referring to the figures by characters of reference 1 designates a clencher rim and this rim constitutes the seat for a series of attaching members each of which consists of spaced gripping members in the form of blocks 2 having sockets 3 screw threaded as shown and adapted to be engaged by the threaded end portions of an adjusting member 4. One end of this member has a right hand thread and the other end is provided with a left hand thread so that, when the member is rotated in one direction, the gripping members will be moved apart and will frictionally engage the side portions of the rim 1. An opening 5 is preferably formed in the middle portion of the spreading member and is designed to receive a cotter pin 6 or the like which serves to prevent said member from rotating after the parts have once been adjusted.

Each of the gripping members 2 has an ear 6' extending therefrom and provided with an aperture 7. The ears on the two gripping members diverge outwardly and are engaged by coiled springs 8. One pair of these springs extends from each ear, the springs of each pair diverging outwardly and being connected to an inwardly curved flange 9 formed integral with a metal ring 10 constituting the main body of the tire. This ring is concavo-convex in cross section and the middle portion of its outer surface is preferably provided with a tread 11 of leather or other suitable material.

Openings 12 may be formed within the flanges 9 and side shields or coverings 13 are preferably laced to these apertured portions of the flanges and extended across the sides of the rim, the inner edge portions of these shields being connected by laces 14. These shields are preferably formed of canvas or other flexible material which serves to prevent the admission of dirt and moisture to the interior of the tire without, however, interfering with the resiliency of the said tire.

To attach the tire to the wheel rim, the gripping members 2 are first adjusted toward each other by rotating the member 4. Said gripping members are then placed upon the outer face of the rim 1 at proper intervals and by rotating the spreading member 4, blocks 2 can be caused to move apart and be firmly engaged by the side portions of the rim 1. All of the springs 8 will thus be held under stress and, by reason of the fact that these springs are arranged in pairs, each pair being made up of outwardly diverging springs and as the springs of opposed pairs likewise diverge outwardly, the ring 10 will be maintained at all times in proper relation to the rim and will be able to withstand excessive lateral strain.

It will be noted that, aside from the shields 13, the entire tire is formed of metal. Notwithstanding this fact, however, said tire can readily be placed upon a wheel and does not necessitate the use of any special form of rim other than the ordinary clencher rim such as is commonly employed in connection with tires of certain types. By utilizing the holding pins 6, the gripping members 2 are prevented from loosening upon the rim.

What is claimed is:—

1. A spring tire consisting of a body, gripping blocks arranged in spaced pairs, spreading devices interposed between and engaging the gripping blocks of each pair, and spring connections between said gripping members and the body.

2. A spring tire including a body, rim gripping blocks arranged in pairs and adjustably connected, elastic connections between each block and the body, the connections upon the two blocks of each pair diverging outwardly toward the body, and the connections upon each member also diverging outwardly toward the body.

3. A spring tire including a body, spaced rim gripping blocks arranged in pairs, a spreading member engaging the blocks of each pair and adapted to simultaneously shift them in opposite directions, means engaging said spreading member and coöperating with the rim for holding the member against rotation, and elastic connections between the members and the body.

In testimony that I claim the foregoing as my own, I have hereto affixed my signature in the presence of two witnesses.

JOHN W. GILLIAM.

Witnesses:
W. N. SHORT,
CLARE S. NOBLE.

Copies of this patent may be obtained for five cents each, by addressing the "Commissioner of Patents, Washington, D. C."